United States Patent [19]
McKiel, Jr.

[11] Patent Number: 5,953,140
[45] Date of Patent: Sep. 14, 1999

[54] ELECTRICAL DOMAIN IMPROVEMENT OF OPTICALLY FILTERED SIGNALS

[75] Inventor: Frank A. McKiel, Jr., Plano, Tex.

[73] Assignee: MCI Communications Corporation, Washington, D.C.

[21] Appl. No.: 08/940,876

[22] Filed: Sep. 30, 1997

[51] Int. Cl.[6] .................................................. H04J 14/02

[52] U.S. Cl. ........................... 359/124; 359/111; 359/161; 379/417

[58] Field of Search .................................... 359/111, 124, 359/130, 161; 379/406, 410, 417

[56] References Cited

U.S. PATENT DOCUMENTS 5,469,288  11/1995  Onaka et al. ............................. 359/124
5,557,439   9/1996  Alexander et al. ...................... 359/130

Primary Examiner—Kinfe-Michael Negash

[57] ABSTRACT

An efficient and inexpensive system and method for reducing crosstalk between adjacent channels in a high density WDM transmission. The technique provided herein cancels out the effects of crosstalk by processing signals in the electrical domain after the optical WDM transmission has been demultiplexed. Specifically, a WDM transmission is received and demultiplexed into its constituent channels via a plurality of optical filters. Each channel is then transduced into an electrical signal using a photodetector or the like. Each electrical signal is then inverted, attenuated and added to one or two adjacent channels to cancel crosstalk therein.

18 Claims, 5 Drawing Sheets

ELECTRICAL DOMAIN IMPROVEMENT OF OPTICALLY FILTERED SIGNALS

BACKGROUND OF THE INVENTION

1. Field of the Invention

The present invention relates generally to signal processing, and more particularly to a system and method for reducing crosstalk between adjacent channels in a wavelength division multiplexing (WDM) transmission.

2. Related Art

In optical communications, wavelength division multiplexing (WDM) techniques are often used to transmit multiple digital signals along a single optical transmission medium. An example of such an optical transmission medium is a fiber optical cable, such as those used in the telecommunications industry. WDM transmissions comprise multiple signals or channels, each having a different and distinct wavelength (or a particular range of wavelengths). In this fashion, multiple signals are simultaneously transported along a single fiber optical cable.

At the receiving end of a WDM transmission, the individual channels are reconstructed using optical filtering techniques that serve to separate the channels according to their wavelengths. Typically, 2, 4, 8 and 16 individual channels are multiplexed in this fashion.

In a typical example, a long distance telecommunications carrier may transport a WDM transmission having 16 individual digital communication channels along a single fiber. Each channel typically comprises a signal having the capacity to carry a large number of simultaneous voice and data channels. For example, each channel in the WDM transmission may comprise a standard SONET Optical Carrier-48 (OC48) channel having a transmission rate of 2.4 Gbps.

In this example, each OC-48 channel has the capacity to carry approximately 32,256 standard voice signals. Thus, because 12 OC48 channels are multiplexed in the fashion described above, a single optical fiber can carry the equivalent of approximately 387,072 standard voice channels using WDM techniques.

Accordingly, WDM techniques allow for a dramatic increase in the signal density of new and existing fiber optical cables. It is desirable to multiplex as many channels as possible using such WDM techniques in order to increase the transmission capacity of a service provider without having to deploy additional and/or new fiber optical cables.

However, problems occur as the signal density of WDM transmissions increase. One problem likely to occur as a result of increasing the number of channels in a WDM transmission, is the problem of crosstalk between adjacent channels. This type of crosstalk occurs when components of separate WDM channels interfere and combine with adjacent WDM channels. The term "adjacent" as used herein refers to channels that are adjacent to each other according to their wavelength in the optical WDM transmission.

As stated, crosstalk is more likely to occur as more channels are crowded into the limited passband of an optical link. One technique used to avoid or reduce the instances of crosstalk between channels is to precisely control the wavelengths of the individual channels and to restrict the modulation bandwidth of each channel. However, this type of control places stringent requirements upon lasers and in particular, it places stringent requirements upon optical filters at the receive end of the WDM transmission.

For example, the use of highly selective and precise optical filters at the receive end of a WDM transmission would yield a reduction in the unwanted crosstalk components from adjacent channels. However, the use of such filters has several disadvantages. One disadvantage is that they are more expensive than less precise filters. Another disadvantage is that they are more susceptible to frequency drift. In addition, such filters can have undesirable delay characteristics.

Another technique that has been used to reduce and/or avoid crosstalk is to provide a guardband between adjacent channels. In this fashion, leakage from one wavelength to another is thereby reduced due to the spacing between the channel frequencies. However, such guardbands take up valuable bandwidth space in the optical link and such space is wasted because useful information is not transmitted within the guardbands.

Therefore, what is needed is an efficient and inexpensive system and method that can be used to reduce crosstalk between adjacent channels in a high density WDM transmission.

SUMMARY OF THE INVENTION

Accordingly, the present invention provides an efficient and inexpensive system and method for reducing crosstalk between adjacent channels in a high density WDM transmission. The system and method of the present invention can be implemented using inexpensive commonly available components. Further, an implementation of the present invention does not require the precise and expensive components as does some of the conventional solutions described above.

The technique provided herein is used to cancel out the effects of crosstalk by processing signals in the electrical domain after the optical WDM transmission has been demultiplexed and transduced into electrical signals. More specifically, a WDM transmission is received by a receiving station. At the receiving station, the WDM transmission is demultiplexed into its constituent channels by using a plurality of optical filters, each corresponding to the wavelength of a particular constituent channel. Each channel is then transduced into an electrical signal using a photodetector or the like.

After the conversion to electrical signals, each signal is then inverted and attenuated. The inverted and attenuated signal is then added to one or two adjacent channels. As stated, adjacent channels refers to channels that are adjacent to each other according to their wavelength in the optical WDM transmission.

The inverted and attenuated signal represents a signal that when added to an adjacent channel, cancels out the crosstalk therein. Accordingly, crosstalk components are eliminated by adding an inverted and attenuated signal that is derived from a channel that is the source of the crosstalk from the adjacent channel. Note that crosstalk components can also be introduced from other nearby channels that are not directly adjacent. Accordingly, such components can also be eliminated by adding an inverted and attenuated signal that is derived from such nearby channel, according to the principles disclosed in the present specification.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein.

DETAILED DESCRIPTION OF THE PREFERRED EMBODIMENTS

The present invention provides an efficient and inexpensive system and method for reducing or eliminating crosstalk between adjacent channels in a high density WDM transmission.

Figure 1:
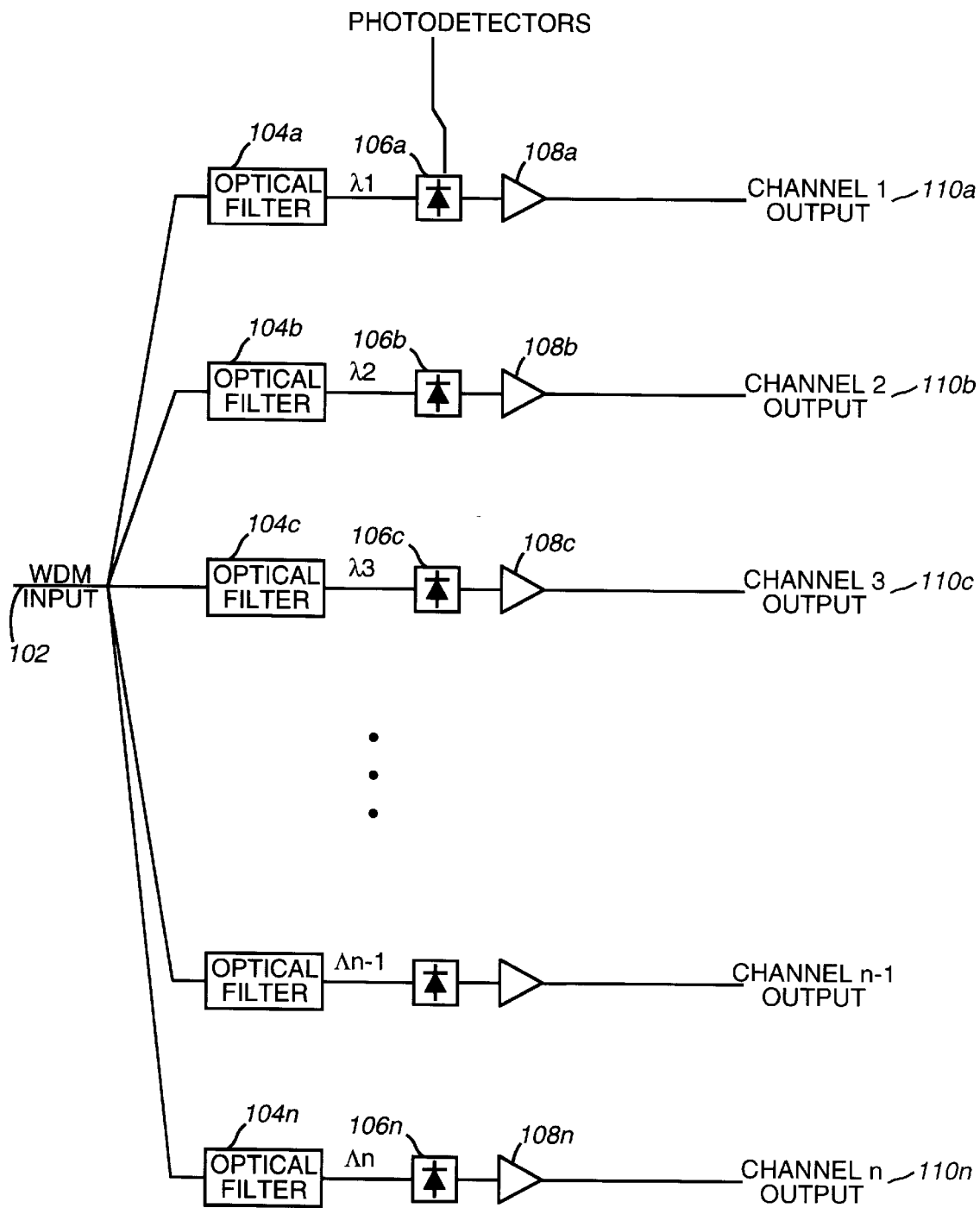
FIG. 1 is a block diagram depicting a typical WDM transmission system.

FIG. 1 depicts the receive end of a typical Wavelength Division Multiplexing (WDM) system. In this example, n channels are depicted. As stated, typical values for n are 2,4, 8 and 16. However other values for n are also possible, such as values greater than 16. The specific value of n varies with different implementations of the present invention.

The WDM transmission is received at the WDM input 102. This signal represents the WDM transmission comprising a plurality of channels having various wavelengths in the optical domain. The output from the WDM transmission is a plurality of output signals represented by the output channels 110a–110n. The output channels 110a–110n are in the electrical domain.

As stated above, in a typical example, a long distance telecommunications carrier transports, n individual digital communication channels on a single fiber (represented by the single WDM input 102). Each channel represented by the channel outputs 110a–110n comprises a digital signal having the capacity to carry a plurality of simultaneous voice and data channels. For example, each channel may comprise a standard SONET OC-48 channel having a transmission rate of 2.4 Gbps, which translates into approximately 32,256 standard voice signals.

A plurality of optical filters 104a–104n are used to filter out channels from the composite WDM transmission according to their wavelengths in the optical domain. For example, the optical filter 104a is used to filter out the channel 110a having a wavelength of $\lambda_1$. Similarly, the optical filter 104b is used to filter out the channel 110b having a wavelength of $\lambda_2$. In a similar fashion, the optical filters 104c–104n are used to filter out the channels 110c–110n having wavelengths $\lambda_c$–$\lambda_n$.

The use of optical filters is one example of one means to separate the components of a WDM transmission. Many other wavelength-selective techniques can also be used. As such, the use of optical filters should not be construed to limit the scope of the present invention. Examples of other wavelength-selective techniques that can be used with the present invention include inline fiber gratings, spatial diffraction gratings, cavity filters and acousto-optic filters. These techniques exhibit similar limitations as optical filters in terms of their stability, wavelength selectivity, insertion loss and expense.

After each channel is reconstructed via the optical filter 104a–104n, a plurality of photodetectors 106a–106n are used to transduce the optical signals into electrical signals. For example, the photodetector 106a is used to transduce the optical signal associated with channel 110a into an electrical signal. Similarly, the photodetector 106b is used to transduce the optical signal associated with channel 110b into an electrical signal. In a similar fashion, the photodetectors 106c–106n are used to transduce the optical signals associated with channels 110c–110n into electrical signals.

After each optical signal is converted into an electrical signal, an amplifier 108a–108n is used to amplify the electrical signal. For example the electrical signal associated with channel 110a is amplified via the electrical domain amplifier 108a. Similarly, the electrical signal associated with channel 110b is amplified via the electrical domain amplifier 108b. In a similar fashion, the electrical signals associated with the channels 110c–110c are amplified via the electrical domain amplifiers 108c–108n, respectively.

Figure 2:
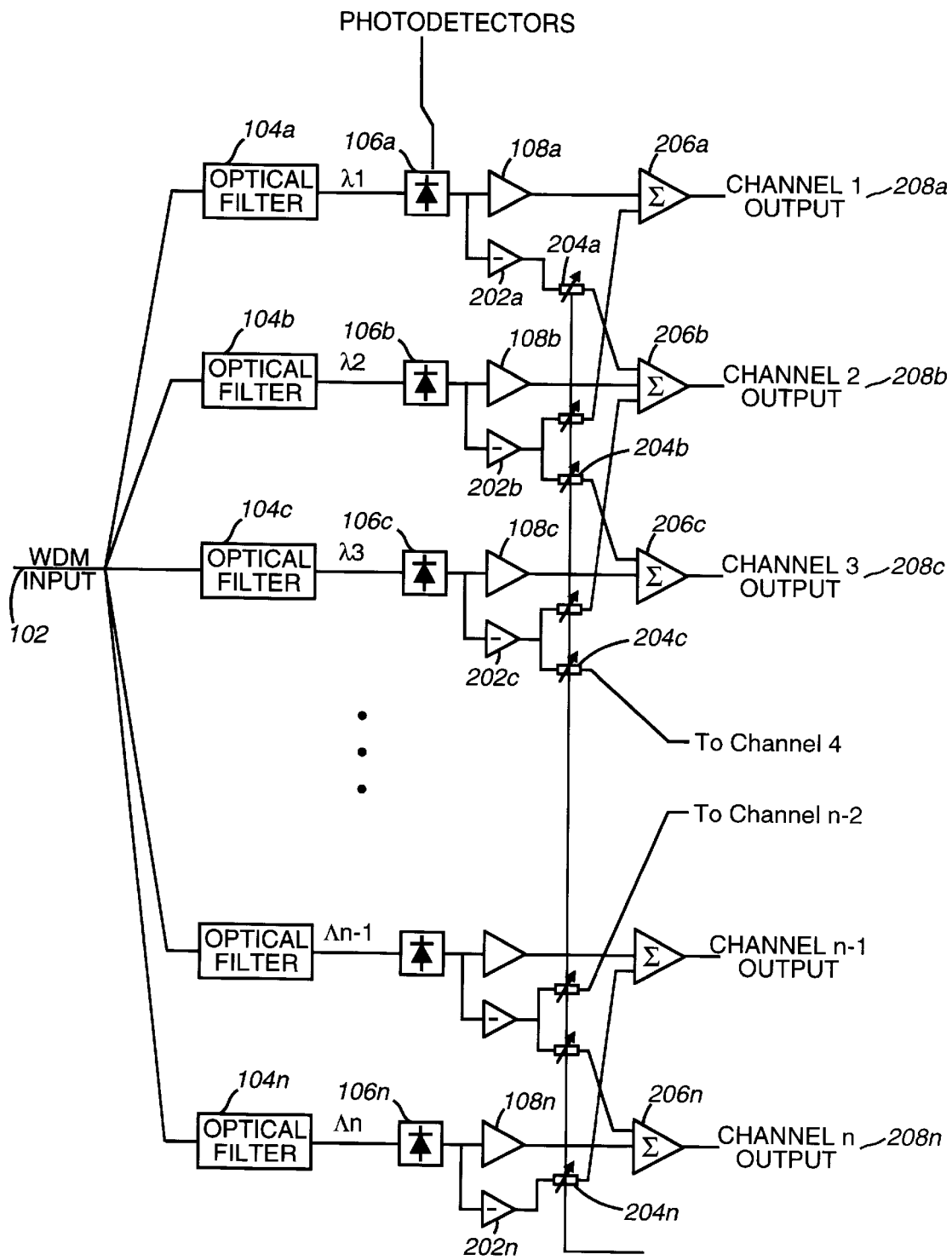
FIG. 2 is a block diagram depicting an improved WDM transmission system that cancels out crosstalk from adjacent channels according to a preferred embodiment of the present invention.

FIG. 2 depicts an embodiment of the present invention that is used to reduce crosstalk caused by leakage of signals from adjacent and nearby channels. As the term is used herein, adjacent channels refers to channels that are adjacent to each other according to their wavelength in the optical WDM transmission. For example, suppose an 8 channel WDM transmission comprises the following channels:

| Channel Number | Wavelength (Nanometers) |
| --- | --- |
| 1 | 1540 |
| 2 | 1542 |
| 3 | 1544 |
| 4 | 1546 |
| 5 | 1548 |
| 6 | 1550 |
| 7 | 1552 |
| 8 | 1554 |

Accordingly, as can be seen by the above table, the channel numbers are listed in accordance to their wavelengths. Hence, using the terminology described above, it can be said that channel 1 is adjacent to channel 2, channel 2 is adjacent to channels 1 and 3, channel 3 is adjacent to channels 2 and 4, channel 4 is adjacent to channels 3 and 5, channel 5 is adjacent to channels 4 and 6, channel 6 is adjacent to channels 5 and 7, channel 7 is adjacent to channels 6 and 8, and channel 8 is adjacent to channel 7.

Likewise, in the examples presented in FIGS. 1 and 2, it is assumed that the channels 110a–110n, and 208a–208n respectively, are presented in order according to their wavelengths. Thus, channel 208b is adjacent to channels 208a and 208c. Likewise, channel 208c is adjacent to channels 208b and 208d. In short, each channel 208a–208n has two adjacent channels associated with it, except for the first 208a and the last 208n channel, which have only one channel adjacent to them.

Referring now to FIG. 2, the use of common reference numbers indicate similar elements as those used in the typical WDM system depicted in FIG. 1. Specifically, the WDM input, the optical filters 104a–104n, the photodetectors 106a–106n and the electrical domain amplifiers 108a–108n are similar in form and function to the corresponding components in the typical WDM system presented in FIG. 1.

However, in addition to the components of the typical WDM system presented in FIG. 1, the preferred embodiment of the present invention as depicted by FIG. 2, comprises elements that serve to reduce the effects of crosstalk caused by leakage of signals between adjacent channels. Specifically, the additional components include a plurality of inverters 202a–202n, variable attenuators 204a–204n and summing amplifiers 206a–206n. These additional components function to reduce unwanted crosstalk in a given channel by adding them with inverted signals from one or more adjacent channels.

Accordingly, in a preferred embodiment, after each optical signal is transduced into an electrical signal, it is inverted, attenuated and added to one or two adjacent signals. For example, after the signal associated with the channel 208b is transduced via the photodetector 106b, the signal is inverted with the inverter 202b. The inverted signal is then attenuated with the variable attenuator 204b. The inverted/attenuated signal (point 212), is then added, via the summing amplifier 206a, to the adjacent signal 208a. The inverted/attenuated signal is referred to herein as the "crosstalk cancellation" signal.

In this fashion, unwanted crosstalk in the channel 208a, which is caused by leakage from the signal in the channel 208b is virtually eliminated by the addition of the inverted signal (crosstalk cancellation signal) from the channel 208b.

It should be understood that crosstalk from adjacent signals are due primarily to inadequacies in the wavelength-domain response of the optical filters 104a–104n. That is, imperfections in the frequency response of the optical filters 104a–104n are the primary cause of the crosstalk that is sought to be eliminated by an embodiment of the present invention. It should also be understood that inadequacies in the frequency domain response of the optical filters 104a–104n appears as amplitude-domain leakage into adjacent channels in the electrical domain. Thus, unwanted crosstalk is counteracted by an embodiment of the present invention by injecting an inverted sample of the interfering signal in the electrical domain. This inverted signal is derived from the adjacent channel's electrical signal.

Figure 3A:
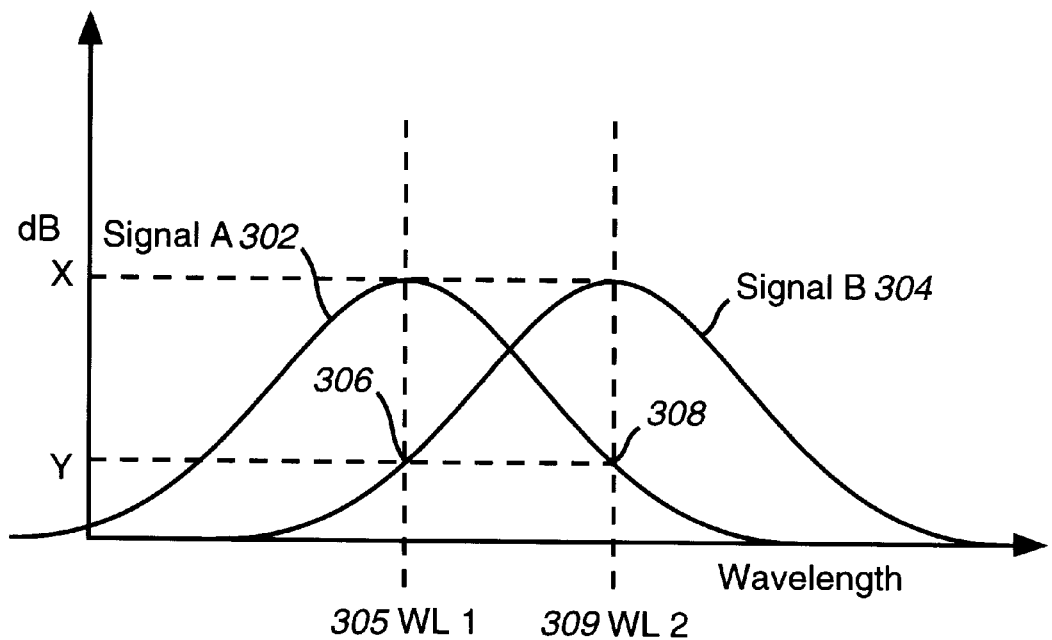
FIG. 3A is a graph depicting response curves for typical optical filters that can be used according to a preferred embodiment of the present invention.

Inadequacies in the wavelength-domain response of typical optical filters are illustrated in FIG. 3A. In FIG. 3A, two response curves 302 and 304 are depicted for signals A and B, respectively. The curve for signal A 302 corresponds to a filter response for a signal having a wavelength of WL1 305. The curve for signal B 304 corresponds to a filter response for a signal having a wavelength of WL2 309.

As can be seen from FIG. 3A, the resulting filtered signal associated with signal A 302, not only has a component from signal A 302 (having a strength, XdB), but also has a component 306 from signal B 304 (having a strength YdB). The same can be seen for the filtered signal associated with signal B 304. That is, the resulting filtered signal associated with signal B 304, not only has a component from signal B 304 (having a strength, XdB), but also has a component 308 from signal A 304 (having a strength YdB). As stated this is due to inadequacies in the wavelength-domain response of typical commonly available optical filters.

Figure 3B:
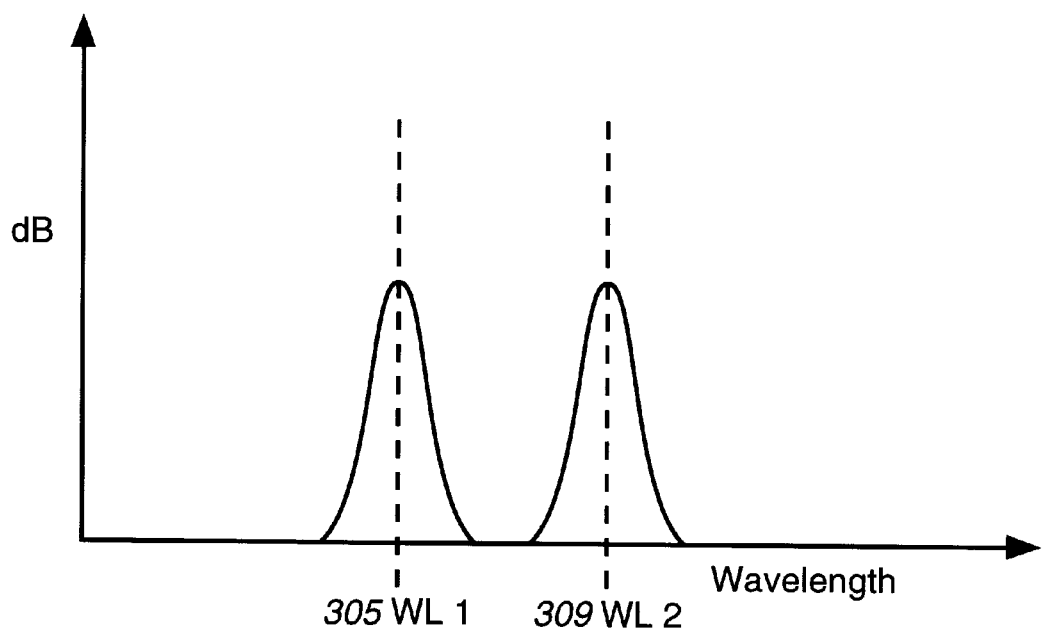
FIG. 3B is a graph depicting response curves for highly selective optical filters.

However, as stated, the present invention allows for the use of commonly available optical filters having response curves similar to those shown in FIG. 3A. This is in contrast with using expensive and highly selective optical filters having response curves similar to those shown in FIG. 3B. As stated, this is not only more economical, but avoids having to use highly selective filters that can be more susceptible to frequency drifts and can have some undesirable delay characteristics.

Referring back now to FIG. 2, an inverted and attenuated signal from each channel is added to the output signal of the adjacent channel(s). For example, the output signal 208a is known to comprise unwanted crosstalk from the adjacent channel 208b. Thus, it can be said that:

$$\text{Signal}_{208a} = AX_{\lambda 1}(t) + BX_{80\ 2}(t) \qquad \text{Equation 1 (point 210a)}$$

Where $X_{\lambda 1}(t)$ is the desired electrical signal in the channel 208a corresponding with $\lambda_1$ in the optical domain, $X_{\lambda 2}(t)$ is the undesired electrical crosstalk signal in channel 208a corresponding with $\lambda_2$ from the adjacent channel 208b, A is a coefficient indicating the strength of $X_{\lambda 1}(t)$ and B is a coefficient indicating the strength of $X_{\lambda 2}(t)$.

Accordingly, in order to cancel out the effects of the unwanted crosstalk signal in channel 208a, the signal $BX_{\lambda 2}(t)$ is subtracted from the $\text{Signal}_{208a}$. This yields a new value for the $\text{Signal}_{208a}$, of:

$$\text{Signal}_{208a} = AX_{\lambda 1}(t) + BX_{\lambda 2}(t) - BX_{\lambda 2}(t) = AX_{\lambda 1}(t) \qquad \text{Equation 2 (point 210b)}$$

which leaves only the desired signal in channel 208a, namely $AX_{\lambda 1}(t)$.

As can be seen by FIG. 2, the undesired crosstalk components are canceled out from $\text{Signal}_{208}$ by adding in the inverted signal $[-BX_{\lambda 2}(t)]$. The inverted signal $[-BX_{\lambda 2}(t)]$ is generated by using the inverter 202b and the attenuator 204b (top).

In this example, the value of B is derived using the known frequency response of the optical filter 104a, such as the example shown in FIG. 3A, and is controlled by adjusting the attenuator 204b.

In a similar fashion, the output signal 208b comprises unwanted crosstalk from the adjacent channels 208a and 208c. Thus, it can be said that:

$$\text{Signal}_{208b} = AX_{\lambda 2}(t) + BX_{\lambda 1}(t) + CX_{\lambda 3}(t) \quad \text{Equation 3(point 210c)}$$

Where $X\lambda 2(t)$ is the desired electrical signal in the channel 208b corresponding with $\lambda_2$ in the optical domain, $X_{\lambda 1}(t)$ is the undesired electrical crosstalk signal in channel 208b corresponding with $\lambda_1$ from the adjacent channel 208b, $X_{\lambda 3}(t)$ is the undesired electrical crosstalk signal in channel 208b corresponding with $\lambda_3$ from Channel 208c, A is a coefficient indicating the strength of $X_{\lambda 2}(t)$, B is a coefficient indicating the strength of $X_{\lambda 1}(t)$ and C is a coefficient indicating the strength of $X_{\lambda 3}(t)$.

Accordingly, in order to cancel out the effects of the unwanted crosstalk signal in channel 208b, the signals $BX_{\lambda 1}(t)$ and $BX_3(t)$ are subtracted from the $\text{Signal}_{208b}$. This yields a new value for the $\text{Signal}_{208a}$ of:

$$\text{Signal}_{208b} = AX_{\lambda 2}(t) + BX_{\lambda 1}(t) + CX_{\lambda 3}(t) - BX_{\lambda 1}(t) - CX_{\lambda 3}(t) = AX_{\lambda 2}(t) \qquad \text{Equation 4 (point210d)}$$

which leaves only the desired signal in channel 208b, namely $AX_{\lambda 2}(t)$.

As can be seen by FIG. 2, the undesired crosstalk components are canceled out from $\text{Signal}_{208}a$ by adding in the inverted signals $[-_{\lambda 1}(t) \text{ and } -BX_{\lambda 3}(t)]$. The inverted signals are generated by using the inverters 202a, 202c and the attenuators 204a and 204c (top).

Accordingly, unwanted crosstalk originating from two adjacent channels (or one adjacent channel in case of the first and last channel, 208a and 208n, respectively), are canceled out by adding the appropriately attenuated inverted signals.

It should be noted that the attenuated adjacent signal that is added with the desired signal, not only contains attenuated and inverted components of the unwanted signal, but also contains attenuated and inverted components of the desired signal. Accordingly, when the crosstalk cancellation signal is added to the desired signal, as described above, not only does it cancel out the crosstalk component therein, but it also slightly subtracts from the desired signal. However, this subtraction is generally so slight it can be neglected.

Figure 4:
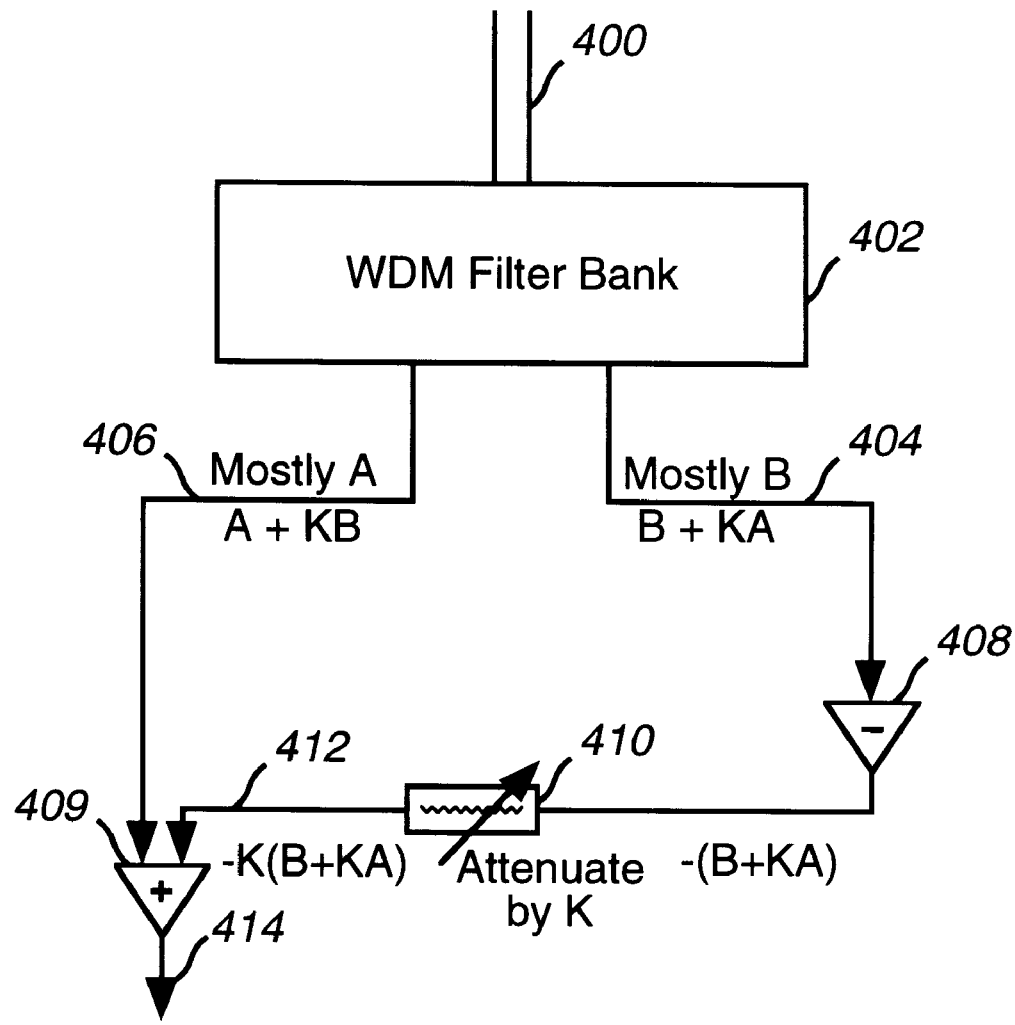
FIG. 4 is a block diagram depicting a WDM transmission and several components of the present invention that are useful for describing the effects of mutual crosstalk in adjacent channels according to a preferred embodiment of the present invention.

This can be seen in FIGS. 3A and 4. In this example it is assumed that the signal B 304 is the crosstalk cancellation signal and the signal A 302 is the desired signal. Because the crosstalk cancellation signal 304 also contains a component of signal A 308, part of desired signal A is reduced by a certain amount. As stated, this amount is typically negligible as will be shown below.

Referring now to FIG. 4, only the two signals A and B are depicted for simplicity. Again, it is assumed that signal A is the desired signal, and signal B is the crosstalk cancellation signal. Accordingly, the WDM transmission 400 is filtered at the WDM filter bank 402. The output from the WDM filter bank are the two signals 406 (comprising mostly A), and 404 (comprising mostly B). More specifically, signal 406 comprises A+KB and signal B comprises B+KA. In this example, it is assumed that K is less than one. Typical values for K is between zero and 0.2.

Accordingly, the crosstalk cancellation signal 404 is inverted at the inverter 408, resulting in the inverted signal −(B+KA). The inverted signal is then attenuated by the variable attenuator 410. The value of the variable attenuator is set to K to match the crosstalk component of B in signal 406, namely KB. The output 412 from the attenuator 410 is the signal −K(B+KA).

This signal is added, at the adder 409, with the signal 406 comprising A+KB. Accordingly as shown, the resulting signal at point 414 is as follows:

$$A+KB-K(B+KA)=A+KB-KB-K^2A=A-K^{2A}.$$

Accordingly, the desired signal A is reduced by $K^2A$. In this example, it is assumed that K=0.1, a typical value. Accordingly, the output of signal A 406 is diminished by $K^2A$ or 0.01A. Thus, by using the above method, the crosstalk component in signal A (namely, KB) is eliminated at a cost of diminishing signal A by only 1 percent.

Figure 5:
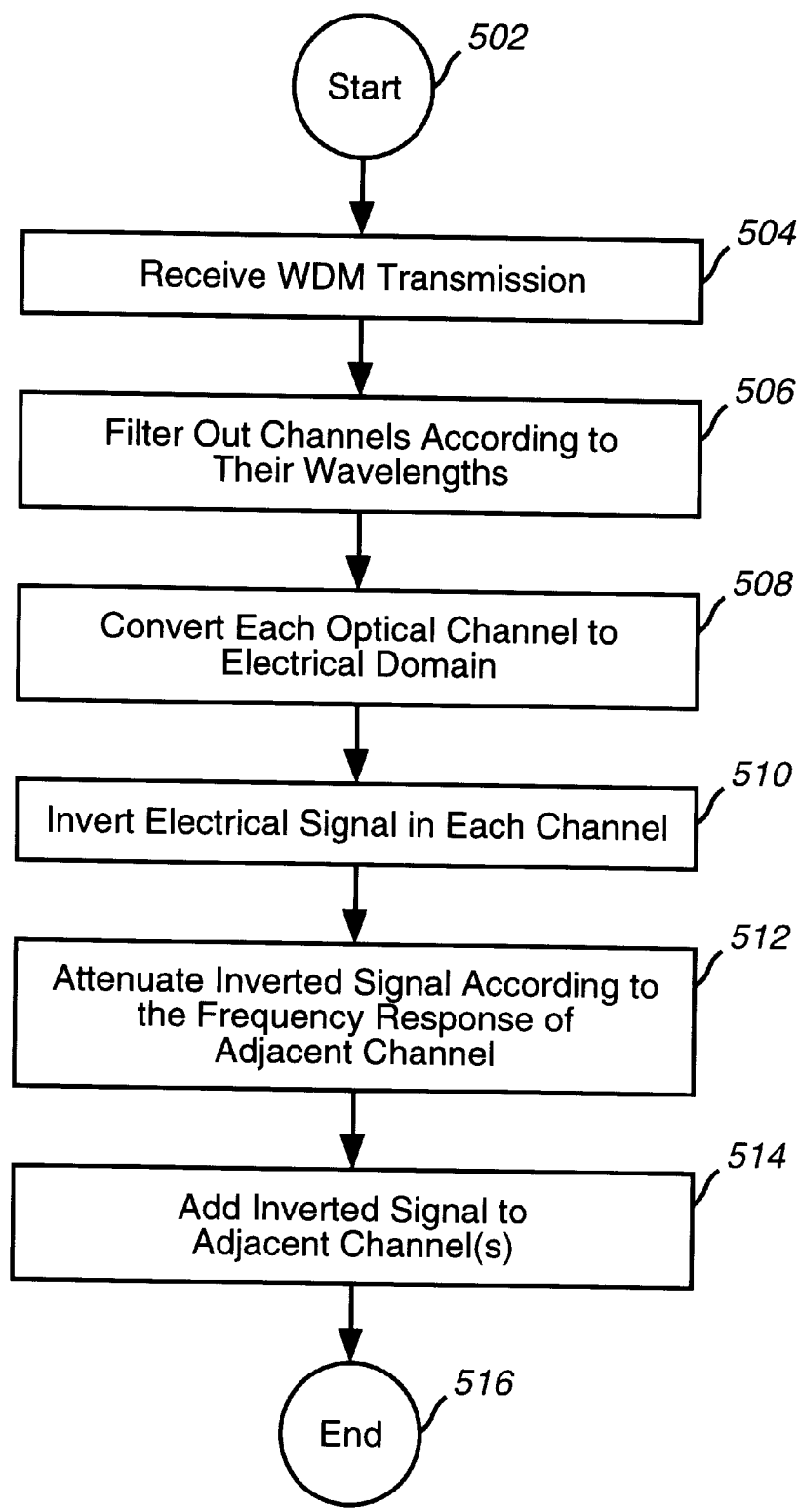
FIG. 5 is a flowchart depicting a method that can be used to cancel crosstalk from adjacent channels according to a preferred embodiment of the present invention.

FIG. 5 is a flowchart depicting a method that can be used to cancel crosstalk from adjacent channels according to a preferred embodiment of the present invention. The process begins with step 502, where control immediately passes to step 504. In step 504 a WDM transmission is received at a receiving station, such as receiving station 102.

Next in step 506 each channel in the WDM transmission is separated from one another through the use of a plurality of optical filters, such as the optical filters 204a–204n. Each optical filter, such as the optical filter 204a corresponds to a particular channel's wavelength, such as $\lambda_1$, which corresponds to channel 208a in FIG.2. After each channel is filtered out from the WDM transmission in this fashion, control passes to step 508.

In step 508, each optical signal associated with each channel, such as channel 208a, is converted to an electrical signal (for example, see point 210a). This is typically accomplished through the use of a photodetector, such as the photodetector 106a. After each channel is converted to an electrical signal, control passes to step 510.

In step 510 each electrical signal in each channel is inverted. This is typically accomplished with the use of an inverter, such as the inverter 202a. Next in step 512, each inverted signal is attenuated. This is typically accomplished through the use of a variable attenuation device such as the variable attenuator 204a. The value of the attenuation is set according to the known frequency response of the corresponding optical filter associated with the adjacent channel, as described above.

Next in step 514 the inverted/attenuated signal (such as the signal at point 212 in FIG. 2), is added to the adjacent channel. This is typically accomplished through the use of a summing amplifier, such as the summing amplifier 206a.

Note that each of the channels 208a–208n has either one or two adjacent channels associated with it. For example, the channel 208a has one adjacent channel associated with it, namely the channel 208b. Therefore, a crosstalk component is expected from the channel 208b. Thus, an inverted/attenuated signal from channel 208b (point 212) is added to the channel 208a at the summing amplifier 206a to cancel out the crosstalk component. The value of the attenuator 204b (top) depends upon the frequency response of the optical filter 104a. That is, due to an imperfect frequency response of the optical filter 104a, it is known that a component from the channel 208b is present in the channel 208a.

As stated, the magnitude of this unwanted crosstalk component from the channel 208b can be calculated from the known frequency response of the optical filter 104a. Accordingly, the attenuator 204b (top) is adjusted so that the magnitude of the attenuated signal at point 212, cancels out the known crosstalk component at the point 216 (after amplification by the amplifier 108a).

In a similar fashion, all of the attenuators 204a–204n are adjusted to cancel out the known crosstalk component in the channel to which such signals are being added. For example, the attenuator 204b (bottom) is adjusted to cancel out the crosstalk component from the channel 208c, which is based on the frequency response of the optical filter 104c. In a similar fashion, the attenuator 204n is adjusted to cancel out the crosstalk component from the channel $208_{n-1}$, which is based on the frequency response of the optical filter $104_{n-p}$.

In general, the frequency response of the optical filters 104a–104n can be predetermined or such values can be dynamically determined in a system, depending on the specific implementation of the present invention. Alternatively, values used for attenuation can be empirically determined based on measured values of crosstalk component in an existing system. Determination of values for the attenuators 204a–204n would be apparent to those skilled in the relevant art(s).

It should be noted that the order of attenuation and inversion can be reversed without departing from the teachings of the present invention. That is, in one embodiment of the present invention, each channel in the electrical domain is attenuated according the principals described above before it is inverted. For example, in this embodiment, steps 510 and 512 in FIG. 5 are reversed.

One of the advantages of the present invention is that relatively inexpensive components can be used for the optical filters 104a–104n. This is so because an implementation of the present invention compensates for inadequacies in such inexpensive components, as described above. Further, another advantage of the present invention is that it allows for more closely spaced wavelength plans to be used in the WDM transmissions.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for reducing crosstalk between adjacent channels in a wavelength division multiplexing (WDM) transmission comprising a plurality of optical channels each having a distinct wavelength, comprising:

receiving means for receiving the WDM transmission;

separation means for separating the received WDM transmission into a plurality of optical channels according to the distinct wavelength of each channel;

conversion means for converting said plurality of optical channels into a plurality of electrical channels;

inversion means for inverting said plurality of electrical channels into a plurality of inverted channels;

attenuation means for attenuating said plurality of inverted channels into a plurality of crosstalk cancellation channels; and summing means for adding one or more of said crosstalk cancellation channels to an adjacent one of said electrical channels to cancel out crosstalk therein.

2. The system of claim 1, wherein said separation means includes a plurality of optical filters for separating the plurality of optical channels according to their distinct wavelengths.

3. The system of claim 1, wherein said separation means includes inline fiber gratings for separating the plurality of optical channels according to their distinct wavelengths.

4. The system of claim 1, wherein said separation means includes spatial diffraction gratings for separating the plurality of optical channels according to their distinct wavelengths.

5. The system of claim 1, wherein said separation means includes cavity filters for separating the plurality of optical channels according to their distinct wavelengths.

6. The system of claim 1, wherein said separation means includes acousto-optic filters for separating the plurality of optical channels according to their distinct wavelengths.

7. The system of claim 1, wherein said conversion means includes a plurality of photodetectors.

8. The system of claim 1, wherein said inversion means includes a plurality of electrical inverters.

9. The system of claim 2, wherein said attenuation means includes a plurality of variable attenuators.

10. The system of claim 1, wherein said summing means includes a plurality of summing amplifiers.

11. The system of claim 9, wherein said variable attenuators are adjusted according to predetermined frequency responses of said optical filters corresponding to an adjacent one of said plurality of optical channels.

12. The system of claim 9, wherein said variable attenuators are dynamically adjusted according to a calculated frequency response of one of said optical filters corresponding to an adjacent one of said optical channels.

13. Apparatus for canceling out crosstalk from adjacent channels in a wavelength division multiplexing (WDM) transmission comprising a plurality of optical channels, each having a distinct wavelength, comprising:

a WDM receiving station for receiving the WDM transmission;

a plurality of optical filters coupled with said WDM receiving station, each corresponding with a distinct wavelength, for separating the plurality of optical channels from the WDM transmission;

a plurality of photodetectors, each coupled with respective ones of said plurality of optical filters, for transducing said plurality of optical channels into a plurality of electrical channels;

a plurality of inverters, each coupled with respective ones of said plurality of electrical channels, for generating a plurality of inverted electrical channels;

a plurality of variable attenuators, each coupled with respective ones of said plurality of inverted electrical channels, for generating a plurality of crosstalk cancellation channels; and a plurality of summing amplifiers, each coupled with respective ones of said plurality of electrical channels and respective ones of said plurality of crosstalk cancellation channels, wherein one of said plurality of crosstalk cancellation channels is adjacent to a respective one of said plurality of electrical channels.

14. The apparatus of claim 13, wherein said plurality of variable attenuators are each adjusted according to a predetermined frequency response associated with an adjacent one of said plurality of optical filters.

15. The apparatus of claim 13, wherein said plurality of variable attenuators are each dynamically adjusted according to a calculated frequency response associated with an adjacent one of said plurality of optical filters.

16. A method for canceling crosstalk from adjacent channels in a wavelength division multiplexing (WDM) transmission, comprising the steps of:

receiving the WDM transmission;

separating the WDM transmission into a plurality of optical channels;

converting said plurality of optical channels into a plurality of electrical channels;

inverting said plurality of electrical channels;

attenuating said plurality of electrical channels; and adding a signal resulting from said converting, inverting and attenuating steps to an adjacent one of said plurality of electrical channels to cancel crosstalk therein.

17. The method of claim 16, wherein said attenuating step further comprises:

calculating an attenuation value for said attenuating step according to a frequency response of said separating step corresponding with said adjacent one of said plurality of electrical channels.

18. The method of claim 16, wherein said attenuating step further comprises:

calculating an attenuation value for said attenuating step according to empirical measurements for determining a crosstalk component corresponding with said adjacent one of said plurality of electrical channels.

* * * * *